United States Patent Office 3,294,790
Patented Dec. 27, 1966

3,294,790
METHOD OF PREPARING HETEROCYCLIC ALDEHYDES
Morton Harfenist, Yonkers, N.Y., assignor to Burroughs Wellcome & Co. (U.S.A.) Inc., Tuckahoe, N.Y., a corporation of New York
No Drawing. Filed May 2, 1963, Ser. No. 277,488
7 Claims. (Cl. 260—243)

The present invention relates to a method for the preparation of a known group of heterocyclic aldehydes unobtainable by previously known reactions. In the broad sense, these compounds can be represented by Formula I

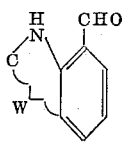

(I)

wherein W is a system of atoms necessary to complete at least one more ring fused to the benzene ring shown in the formula.

In the narrower sense, the method provides access to phenothiazine-1-aldehyde (IIa), phenoxazine-1-aldehyde (IIb) and carbazole-1-aldehyde (IIc).

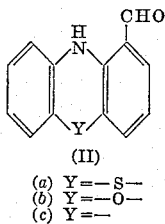

(II)
(a) Y=—S—
(b) Y=—O—
(c) Y=—

These aldehydes have the usual reactivities of their species and are consequently invaluable in standard synthetic reactions of organic chemistry. They also form the usual functional derivatives such as oximes, semicarbazones and the like among which are their thiosemicarbazones which exhibit antibacterial and antiviral activity.

The starting compounds in my synthesis are the "alkyl malonyl" derivatives III, of the parent heterocycles which are readily prepared by heating an alkyl malonic ester with the parent heterocycle. (Harfenist, Blumfeld, Capiris and Magnien, J. Org. Chem., 27, 3977 (1962).) For the present purpose, R is conveniently ethyl. Other values of R are feasible, but since R is not present in the final product, its exact identity is immaterial. The compound III is

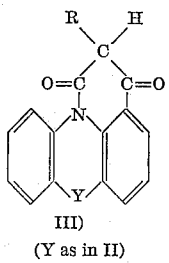
(III)
(Y as in II)

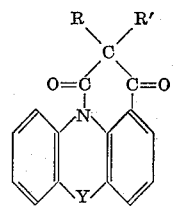
(IV))

converted to a more substituted derivative (IV) wherein R' may be another alkyl group (as methyl or propargyl) or a tertiary amino group which can be prepared by brominating III and reacting the compound IV (R'=Br) with an appropriate secondary amine.

As will be seen, the critical matter about R and R' is that they should be present rather than their detailed identity. If either be hydrogen, the subsequent step fails. (Similarly, they must not be readily removed by reducing agents wherefore the intermediate bromo compounds are unsuitable as the bromine is reduced off.) For my purpose, the values alkyl and dialkylamino are equivalent for R' however dissimilar these groupings may be regarded generally.

When compound IV is treated with lithium aluminum hydride, it is reduced to a colorless compound, probably V, which, when shaken or stirred with water, gives an alkaline solution.

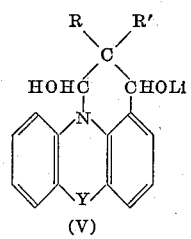

(V)

Under the influence of the alkali, the fragment

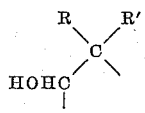

breaks off leaving the desired aldehyde II. These aldehydes are insoluble in water and are readily collected by filtration or extraction with water-immiscible solvents (ether, benzene, etc.).

EXAMPLE 1

*2-bromo-"ethylmalonylphenothiazine"*

A solution of 29 g. (0.098 mole) of "ethylmalonylphenothiazine" in 2 liters of boiling reagent grade carbon tetrachloride was cooled until the first crystals started to form. It was stirred vigorously while a solution of 16.8 g. (0.21 g.-atom) of bromine in 200 ml. of carbon tetrachloride was added as rapidly as the rapid evolution of gas would allow. (Under our conditions, 10 to 20 min.) The solution was kept an additonal 15 min., and then the solvent was removed using a steam bath at water pump pressure. The residual oil was taken up in ether, extracted three times with aqueous sodium carbonate, briefly dried over magnesium sulfate, and again concentrated as before. The resulting oil soon solidified. It was 34.3 g. (93%), and melted at 126–127.5°. It was recrystallized twice more from ethanol-water for analysis, M.P. 130–132°. By similar procedures were prepared 2-bromo-"methylmalonylphenothiazine," 2-bromo-"methylmalonylphenoxazine" and 2-bromo-"ethylmalonylcarbazole."

EXAMPLE 2

*2-dimethylamino-"ethylmalonylcarbazole"*

(IV: R=$C_2H_5$; R'=$N(CH_3)_2$; Y=—). 8.65 g. (0.0256 mole) of 2-bromo-"ethylmalonylcarbazole" was dissolved in 200 ml. of anhydrous ether containing 20 ml. (0.3 mole) of dimethylamine, the whole contained in a pressure bottle. The container was sealed and kept at 30–40° for four days. The contents were then extracted with dilute hydrochloric acid and the aqueous layer was basified with sodium hydroxide solution and extracted in turn with ether. The ethereal extract was dried, evaporated in vacuo and the residue was recrystallized from ether, M.P. 88–92°. It forms a hydrochloride melting at 198–200°.

By the same procedure were prepared 2-dimethylamino-"ethylmalonylphenothiazine"

(IV: R=C$_2$H$_5$; R'=N(CH$_3$)$_2$; Y=S)

which melts at 101°, 2-N'-methylpiperazino-"methylmalonylphenothiazine"

(IV: R=CH$_3$; R'=N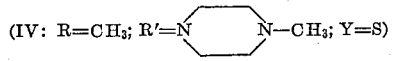N—CH$_3$; Y=S)

whose monohydrochloride melts at 193–198°, and 2-dimethylamino-"ethylmalonylphenoxazine" (IV: R=C$_2$H$_5$; R'=N(CH$_3$)$_2$; Y=O) whose hydrochloride melts at 194–196°.

EXAMPLE 3

2-methyl-"ethylmalonylphenothiazine"

(IV: R=C$_2$H$_5$; R'=CH$_3$; Y=S.) This was prepared by reaction of methyl iodide with the sodio derivative of "ethylmalonylphenothiazine" as described by Harfenist and Magnien (J. Org. Chem., 28, 538 (1963).) Alkylation with higher alkyl halides gives predominantly O-alkyl derivatives (enol ethers) that are not useful for the present purpose. However, alkylation with propargyl bromide gives 2-propargyl derivatives in excellent yield. So prepared were 2-propargyl-"ethylmalonylcarbazole," M.P., 108–110° and 2 - propargylethylmalonylphenothiazine, M.P., 139–141°.

EXAMPLE 4

Phenothiazine-1-aldehyde (IIa)

A solution of 4.95 g. (14.6 mmoles) of 2-ethyl-2-dimethylamino-1,3-diketo-2,3-dihydro-1H-pyrido(3,2,1 - kl) phenothiazine (Ia) in 100 ml. of commercial absolute ether was added during 10 min. with stirring to 1.30 g. (34 mmoles) of lithium aluminum hydride partly dissolved in 50 ml. of absolute ether. The nearly white suspension so produced was heated under reflux for 75 hours and allowed to remain at room temperature for an additional day. Decomposition by the usual dropwise addition of 2.5 ml. of water caused slight yellowing of the initially creamy suspension. A white solid was filtered off. This, on being washed with 95% ethanol, gave an orange material, soluble in either ether or alcohol. Repeated washings with ethanol and ether gave an orange solution with an amine odor. This was extracted with water, then with 4 N aqueous hydrochloric acid, which removed a dark orange substance. Washings with N sodium hydroxide and water, drying over magnesium sulfate and evaporation of solvent, left 2.90 g. (88%) of lovely orange needles, M.P. ca. 65–72°. Two recrystallizations from ethanol-water gave analytically pure orange needles of M.P. 80–81°.

An analogous reduction of 1.78 g. (4.7 mmoles) of 2-methyl-2-(4-methylpiperazino)-1,3-diketo - 2,3 - dihydro-1H - pyrido(3,2,1 - kl)phenothiazine by 417 mg. (11 mmoles) of lithium aluminum hydride gave after 72 hours under reflux 83% of crude phenothiazine-1-aldehyde. This, after recrystallization had the same melting point and infrared absorption as that of the aldehyde from the 2-dimethylamino-"ethylmalonylphenothiazine" above.

This formed an oxime, isolated in nearly quantitative yield as matted yellow needles, by addition of water after 18 hours of boiling with hydroxylammonium acetate in ethanol-water. This was readily recrystallized from ethanol-water, M.P. 97–98.5°. The oxime became discolored in light.

Phenothiazine-1-aldehyde thiosemicarbazone was prepared as orange needles of M.P. 232–237° dec. by heating 2.04 g. of the aldehyde with 1.07 g. of thiosemicarbazide in 230 ml. of absolute ethanol holding 3 ml. of glacial acetic acid for 5 hours. It was recrystallized from much ethanol-water.

EXAMPLE 5

Phenothiazine-1-aldehyde

A solution of 4.69 g. (15.1 mmoles) of 2-methyl-"ethylmalonylphenothiazine" suspended in 250 ml. of commercial anhydrous ether was added rapidly to 1.4 g. (37 mmoles) of lithium aluminum hydride, in 100 ml. of ether, and heated under reflux for 90 hours. The usual work-up gave a first crop which after two recrystallizations, weighed 980 mg. This was shown to be identical to a sample prepared in Example 4 by an undepressed mixture melting point and by identity of infrared absorption curves.

EXAMPLE 6

Phenoxazine-1-aldehyde (IIb)

A solution of 14.6 g. (0.05 mole) of 2-dimethylamino-"methylmalonyl"phenoxazine was warmed with 350 ml. of ether previously dried over calcium hydride, until it dissolved. This solution was added slowly to a solution-suspension of 3.8 g. (0.1 mole) of lithium aluminum hydride, in 50 ml. of ether. When the spontaneous boiling had subsided, the reaction mixture was stirred and heated under reflux for 28 hours and then decomposed by addition of 7.6 ml. of water added over about 7 min. This was followed by addition of 100 ml. each of 95% ethanol and 1 N aqueous sodium hydroxide. The mixture was now stirred for 8 min., transferred to a separatory funnel, and partitioned between ether and 1 N aqueous sodium hydroxide solution. The orange ethereal solution lost much of its color upon extraction with 1 N aqueous hydrochloric acid. It was then dried and concentrated. The resulting orange oil solidified and was washed with hexane, and recrystallized twice from isopropyl alcohol-water. It was then sublimed at 80° (air bath temperature) at 0.08-mm. gage pressure, for analysis. Its melting point remained essentially unchanged at 112–114°.

The above-mentioned hydrochloric acid extract, on standing, deposited colorless crystals of an amine hydrochloride which turned first to a white oil, then orange with aqueous-ethanolic sodium hydroxide. The hydrochloride was recrystallized by solution in water slightly acidified with hydrochloric acid and warming, followed by addition of concentrated aqueous hydrochloric acid to incipient turbidity. Tan crystals were obtained of approximately the same decomposition point as the initial crystals, 177–179° dec. These darkened only slightly on being dried for analysis at 100° (0.01 mm.) overnight, and gave a fair analysis for a monohydrate.

The filtrates of the hydrochloric acid solutions were combined, made basic, and extracted with ether. The residue of evaporation of the ether, on being boiled 17 hours with 66% aqueous ethanol, gave 2 g. more of phenoxazine-1-aldehyde of M.P. 106–110°.

A total of 6.71 g. (58%) of phenoxazine-1-aldehyde of analytical purity was obtained.

EXAMPLE 7

Carbazole-1-aldehyde (IIc)

A solution of 16.5 g. (0.054 mole) of 5-ethyl-5-dimethylamino-4,6-diketo-5,6-dihydro-4H-pyrido(3,2,1 - jk) carbazole (i.e., 5 - dimethylamino - "ethylmalonylcarbazole") in 750 ml. of anhydrous ether, analogously heated under reflux with 8.3 g. (0.22 mole) of lithium aluminum hydride for 68 hours, was carefully decomposed by addition of 60 ml. of acetic acid. An attempt to filter off the solids and extract them separately with ether and ethanol was unsatisfactory, but use of a large excess of sodium fluoride solution, and potassium carbonate in excess led to a turbid solution-suspension which could be extracted with ether. Each ether layer was extracted with water once, and then extracted three times with a total of 350 ml. of 0.6 N aqueous hydrochloric acid. A precipitate which formed at their point was filtered off. It was 9 g. of a white solid, M.P. 178–180°, found subsequently to be quite pure hydrochloride hydrate of the intermediate V (H instead of Li). This was recrystallized twice by solution in hot 0.5 N aqueous hydrochloric acid, and addition of 6 N hydrochloric acid to incipient turbidity. Two interchangeable salts were obtained, one melting at 165.5–168°, and the other, of M.P. 184–186°, produced by prolonged drying (e.g., 100° at 0.01 mm. in a thin layer overnight). The later gave satisfactory elemental analyses in duplicate for a hemihydrate, although once, presumably due to uptake of moisture by this very hydroscopic substance, an analysis for the monohydrate was obtained. The less hydroscopic salt melting about 166° gave satisfactory analyses for the monohydrate.

The combined hydrochloric acid filtrates from which the 9 g. had been obtained gave, on evaporation of solvent at the water pump on the steam bath, an additional 3 g. of less pure IIb hydrochloride. The total yield was thus 61%.

The ether which had been acid-extracted gave on evaporation 2.8 g. of a yellow solid which, on recrystallization from ethanol-water, gave 2.18 g. (21%) of carbazole-1-aldehyde of M.P. 146–146.5°.

When a sample of the hydrochloride of the intermediate was converted to the base by aqueous sodium hydroxide and taken up in ether, it could be recrystallized from ethanol-water and melted at 119–121° to a turbid melt. A second recrystallization from ethanol-water gave analytically pure yellow carbazole-1-aldehyde. This formed a thiosemicarbazone melting at 246° to a turbid melt clear at 253°.

What I claim is:

1. The method of preparing a heterocyclic aldehyde represented by the formula

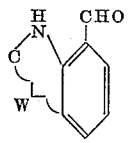

wherein W is a system of atoms consisting of at least one hydrocarbyl ring fused to the benzene ring shown by means of an atom selected from the group consisting of carbon, oxygen, and sulfur, wherein said carbon atom is a member of a hydrocarbyl ring, said oxygen is attached to a carbon atom of a hydrocarbyl ring, and said sulfur atom is attached to a carbon atom of a hydrocarbyl ring, consisting of reducing with lithium aluminum hydride an alkylmalonyl compound of the formula

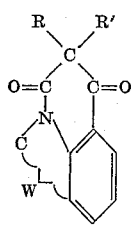

wherein W has the value previously given, R is a lower alkyl group and R' is selected from the group consisting of a lower alkyl group and a lower tertiary amino group, said reduction being carried out in an anhydrous ethereal solution by use of at least one mole of lithium aluminum hydride for each mole of said alkylmalonyl compound, refluxing, hydrolyzing the reaction mixture in an alkaline medium and recovering the aldehyde.

2. The method of preparing a heterocyclic aldehyde represented by the type formula

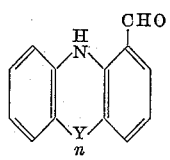

comprising at least two benzene rings wherein $n$ is an integer from 0 to 1 inclusive and Y is an atom selected from the group consisting of oxygen and sulfur, consisting of reducing with lithium aluminum hydride an alkylmalonyl compound of the formula

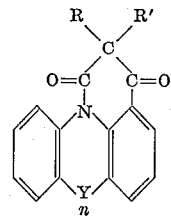

wherein $n$ and Y have the values previously given, R is a lower alkyl group and R' is selected from the group consisting of a lower alkyl group and a lower tertiary amino group, said reduction being carried out in an anhydrous ethereal solution by use of at least one mole of lithium aluminum anhydride for each mole of said alkylmalonyl compound, refluxing, hydrolyzing the reaction mixture in an alkaline medium and recovering the aldehyde.

3. The method of preparing an aldehyde selected from the class consisting of phenothiazine-1-aldehyde, phenoxazine-1-aldehyde and carbazole-1-aldehyde consisting of reducing with lithium aluminum hydride a compound selected from the class consisting of the alkylmalonyl phenothiazines, phenoxazines and carbazoles that carry in the 2-position a second substituent selected from the class consisting of the lower alkyl groups and the lower tertiary amino groups, said reduction being carried out in anhydrous ethereal solution by use of at least one mole of lithium aluminum hydride for each mole of said alkylmalonyl compound, refluxing, hydrolyzing the reaction mixture in an alkaline medium and recovering the aldehyde.

4. The method of preparing phenothiazine-1-aldehyde consisting of reducing with lithium aluminum hydride a compound selected from the class consisting of the 2-alkyl-alkylmalonylphenothiazines and the 2-dialkylamino-alkylmalonylphenothiazines, said reduction being carried out in anhydrous ethereal solution by use of at least one mole of lithium aluminum hydride for each mole of said alkylmalonylphenothiazine compound, refluxing, hydrolyzing the reaction mixture in an alkaline medium and recovering the phenothiazine-1-aldehyde.

5. The method of preparing phenoxazine-1-aldehyde consisting of reducing with lithium aluminum hydride a compound selected from the class consisting of the 2-alkyl-alkylmalonylphenoxazines and the 2-dialkylamino-alkylmalonylphenoxazines, said reduction being carried out in anhydrous ethereal solution by use of at least one mole of lithium aluminum anhydride for each mole of said alkylmalonylphenoxazine compound, refluxing, hydrolyzing the reaction mixture in an alkaline medium and recovering the phenoxazine-1-aldehyde.

6. The method of preparing carbazole-1-aldehyde consisting of reducing with lithium aluminum hydride a compound selected from the class consisting of the 2-alkyl-alkylmalonylcarbazoles and the dialkylamino-alkylmalonylcarbazoles, said reduction being carried out in an anhydrous ethereal solution by use of at least one mole of lithium aluminum hydride for each mole of said alkylmalonylcarbazole compound, refluxing, hydrolyzing the reaction mixture in an alkaline medium and recovering the carbazole-1-aldehyde.

7. Phenoxazine-1-aldehyde.

References Cited by the Examiner

FOREIGN PATENTS 119,189    8/1958    Austria.
217,778    6/1956    Australia.

OTHER REFERENCES

Buu-Hoi et al., Journal of the Chemical Society (1956), p. 716.

Carter et al., J. of the Chemical Society (1957), pp. 2210–15.

WALTER A. MODANCE, *Primary Examiner.*

HARRY I. MOATZ, *Assistant Examiner.*